US010110561B2

(12) United States Patent
Batke et al.

(10) Patent No.: US 10,110,561 B2
(45) Date of Patent: Oct. 23, 2018

(54) FIREWALL WITH APPLICATION PACKET CLASSIFER

(71) Applicant: Rockwell Automation Technologies, Inc., Mayfield Heights, OH (US)

(72) Inventors: Brian A. Batke, Novelty, OH (US); Sivaram Balasubramanian, Solon, OH (US); Petr Ptacek, Auburn Township, OH (US); Taryl Jasper, South Euclid, OH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 114 days.

(21) Appl. No.: 14/554,621

(22) Filed: Nov. 26, 2014

(65) Prior Publication Data

US 2016/0149861 A1    May 26, 2016

(51) Int. Cl.
*H04L 29/06*    (2006.01)
*H04L 29/08*    (2006.01)

(52) U.S. Cl.
CPC ......... *H04L 63/0245* (2013.01); *H04L 63/02* (2013.01); *H04L 63/0254* (2013.01); *H04L 63/0263* (2013.01); *H04L 63/10* (2013.01); *H04L 63/1408* (2013.01); *H04L 67/12* (2013.01)

(58) Field of Classification Search
None
See application file for complete search history.

(56) References Cited

U.S. PATENT DOCUMENTS

| 6,154,775 | A  | * | 11/2000 | Coss | H04L 29/06 709/221 |
| 6,567,408 | B1 | * | 5/2003 | Li | H04L 12/5601 370/395.31 |
| 7,873,998 | B1 | * | 1/2011 | Wilkinson | G06F 21/566 726/13 |
| 7,966,659 | B1 |   | 6/2011 | Wilkinson et al. | |
| 8,112,800 | B1 | * | 2/2012 | Yang | G06F 21/554 726/22 |

(Continued)

OTHER PUBLICATIONS

Tom Shinder, "Dr. Tom Shinder's Configuring ISA Server 2004", ISBN: 1931836191, Dec. 2004.*

(Continued)

*Primary Examiner* — Piotr Poltorak
(74) *Attorney, Agent, or Firm* — Boyle Fredrickson, SC

(57) ABSTRACT

An improved system for establishing rules in a firewall for an industrial network is disclosed. Rules are established at an application level, identifying, for example, actions to occur between two devices. The action may be, for example, read data table or get attribute, and each action may require multiple message packets to be transmitted between the two devices in order to complete. A network device executing the firewall is configured to receive message packets from a sending device and to inspect the message packets to determine which action the sending device is requesting to perform. If the action corresponds to a rule in the database, the network device manages communications between the two devices until all message packets have been transmitted. Thus, a single action, or application, may be defined in the rules database to permit multiple data packets to be communicated between the devices.

16 Claims, 11 Drawing Sheets

(56) References Cited

U.S. PATENT DOCUMENTS

| | | | |
|---|---|---|---|
| 8,484,474 B2 | 7/2013 | Batke et al. | |
| 2003/0028666 A1* | 2/2003 | Hanner | H04L 49/90 709/238 |
| 2003/0084318 A1* | 5/2003 | Schertz | G06F 21/55 726/23 |
| 2003/0115328 A1* | 6/2003 | Salminen | H04L 63/0236 709/225 |
| 2003/0154399 A1* | 8/2003 | Zuk | H04L 63/0254 726/11 |
| 2004/0008681 A1* | 1/2004 | Govindarajan | H04L 29/06 370/394 |
| 2005/0086520 A1* | 4/2005 | Dharmapurikar | H04L 63/145 726/4 |
| 2005/0273850 A1* | 12/2005 | Freund | H04L 63/0227 726/14 |
| 2006/0075481 A1* | 4/2006 | Ross | H04L 63/0263 726/13 |
| 2006/0117385 A1* | 6/2006 | Mester | G06F 21/552 726/22 |
| 2006/0155865 A1 | 7/2006 | Brandt | |
| 2007/0006293 A1* | 1/2007 | Balakrishnan | H04L 63/0245 726/13 |
| 2008/0022405 A1* | 1/2008 | Wang | H04L 63/1441 726/23 |
| 2008/0162609 A1* | 7/2008 | Bigian | H04L 41/0803 |
| 2008/0248879 A1* | 10/2008 | Smith | G07F 17/3223 463/42 |
| 2008/0320582 A1 | 12/2008 | Chen et al. | |
| 2009/0172800 A1* | 7/2009 | Wool | H04L 63/0263 726/11 |
| 2010/0192225 A1* | 7/2010 | Ma | G06F 17/30985 726/23 |
| 2010/0251364 A1* | 9/2010 | Lee | H04L 63/145 726/22 |
| 2012/0198541 A1 | 8/2012 | Reeves | |
| 2013/0094376 A1 | 4/2013 | Reeves | |
| 2013/0156041 A1 | 6/2013 | Vangala | |
| 2014/0201838 A1* | 7/2014 | Varsanyi | H04L 63/1425 726/23 |
| 2014/0380471 A1* | 12/2014 | Levow | H04L 63/1408 726/23 |
| 2015/0271185 A1* | 9/2015 | Rommele | H04L 63/12 713/176 |

OTHER PUBLICATIONS

Technet, TCP/IP Protocol Architecture found at https://technet.microsoft.com/en-us/library/cc958821.aspx on May 11, 2017.*
Roeckl (Chris Roeckl, "Stateful Inspection Firewalls", Juniper Networks, PN 200060-001,'04).*
Zhang (Zhang et al., "On the Safety and Efficiency of Firewall Policy Deployment", IEEE0-7695-2848-1/07, '07).*
Paul Brooks, "EtherNet IP: Industrial Protocol White Paper", Institute of Electrical and Electronic Engineers, Rockvwell Automation, 2001.*
Moxa, "Industrial Protocols User's Guide", 5th Edition, 2013, the author(s) unknown.*
William R. Cheswick et al.: "Firewalls and Internet Security, 2nd Ed"; Addison-Wesley, USA, XP55249533, pp. 185-186, dated Feb. 1, 2007—(3) pages.
Extended European Search Report dated Feb. 16, 2019; European Application No. 15195794.1—(8) pages.

* cited by examiner

| 126 | 128 | 130 | 132 | 134 | 136 | 124 | |
|---|---|---|---|---|---|---|---|
| COMMAND CODE | DATA LENGTH | SESSION HANDLE | STATUS | SENDER CONTEXT | OPTIONS | DATA | |
| | | | | | | BYTE 1 | BYTE n |
| 65 00 | 04 00 | 00 00 00 00 | 00 00 00 00 | 00 00 00 00 00 00 00 00 | 00 00 00 00 | 01 | 00 |

{ HEADER 122 }

| 146 | 148 | 150 | 152 | 154 | 156 | 154 | |
|---|---|---|---|---|---|---|---|
| COMMAND CODE | DATA LENGTH | SESSION HANDLE | STATUS | SENDER CONTEXT | OPTIONS | DATA | |
| | | | | | | BYTE 1 | BYTE n |
| 65 00 | 04 00 | 00 07 02 01 | 00 00 00 00 | 00 00 00 00 00 00 00 00 | 00 00 00 00 | 01 | 00 |

{ HEADER 142 }

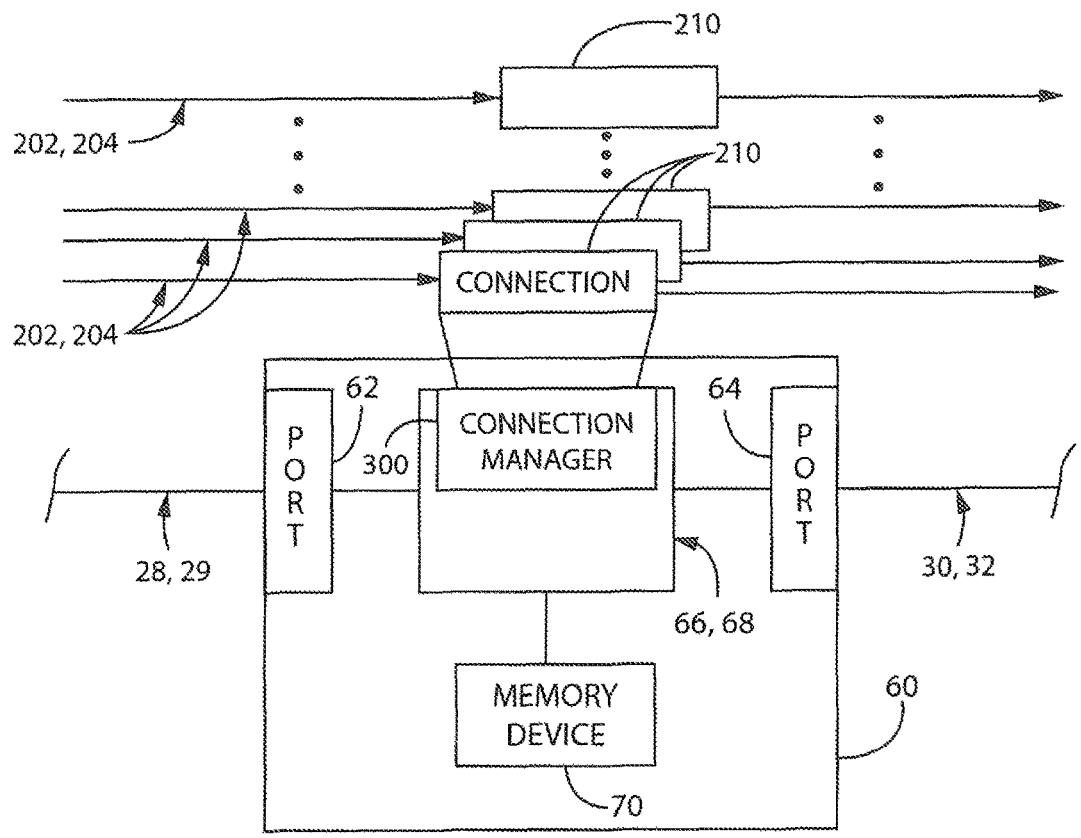

800 → Application Function: Table_Read
        Signatures: (register, 0x12, 0x34, ...)
                    (list, 0x56, 0x78, ...)         ⎫
                    (send, 0x23, 0x45, ...)         ⎬ 802
                    (unregister, 0x67, 0x89, ...)   ⎭
804 → Version: 9999
806 → Revision: 1

FIG. 14

800 → Application Function: Table_Read
        Signatures: (0x A B 1 2 C D 3 4 E F 5 6...) ← 810
804 → Version: 9999
806 → Revision: 1

FIG. 15

FIREWALL WITH APPLICATION PACKET CLASSIFER

BACKGROUND OF THE INVENTION

The subject matter disclosed herein relates generally to a firewall for an industrial network and, more specifically, to a firewall in which rules may be specified at an application level.

Industrial controllers are specialized computer systems used for the control of industrial processes or machinery, for example, in a factory environment. Generally, an industrial controller executes a stored control program that reads inputs from a variety of sensors associated with the controlled process or machine. Sensing the conditions of the process or machine and based on those inputs and the stored control program the industrial controller determines a set of outputs used to control actuators for the process or machine.

Industrial controllers differ from conventional computers in a number of ways. Physically, they are constructed to be substantially more robust against shock and damage and to better resist extreme environmental conditions than conventional computers. The processors and operating systems are optimized for real-time control and are programmed with languages designed to permit rapid development of control programs tailored to a constantly varying set of machine control or process control applications.

Generally, the industrial controllers have a highly modular architecture that allows, for example, different numbers and types of input and output modules to be used to connect the controller to the process or machinery to be controlled. This modularity is facilitated through the use of special "control networks" suitable for highly reliable and available real-time communication. Such control networks (for example, ControlNet, EtherNet/IP, or DeviceNet) differ from standard communication networks (e.g. Ethernet) by guaranteeing maximum communication delays by pre-scheduling the communication capacity of the network and/or providing redundant communication capabilities for high-availability. In addition, packets transmitted on the control network are formatted according to a protocol defined for the particular network, such as the Common Industrial Protocol (CIP).

Over time, the complexity and/or size of the machine or process controlled by the industrial controller has increased. For example, a process line may span the entire length of a bay in an industrial complex or an automated storage system may be distributed over an entire warehouse. As a result, it has become desirable to provide access to the control network for monitoring performance of the machine, process, and/or individual elements executing in the controlled machine or process. Similarly, it may be desirable to provide access to the control network to change the configuration or program of elements executing in the controlled machine or process.

Historically, access may have been provided to a machine operator, for example, via a dedicated terminal located proximate to the controlled machine or process. However, at certain times, such as during commissioning or for troubleshooting, it may be desirable to provide access to a user, such as a system programmer or designer located in a remote building. The control network may then be interfaced to a private intranet, allowing the designer to monitor the system. However, on occasion, it may also be desirable to permit access to a remote site such as a field installation via the Internet. Access may be established, for example, via a virtual private network (VPN) requiring user identification and verification.

However, unauthorized or inadvertent access of the controlled machine or process could result in damage and resultant downtime of the machine or process. Consequently, access to the control network must be restricted. Typically, access to a network may be limited by rules established within a network device such as a switch or a router. The rules are also referred to as a firewall, and the rules determine whether packets received by the network device are allowed to propagate onto the control network.

Certain protocols, such as CIP, provide significant flexibility to a device manufacturer. The protocol includes a framework of objects and layers that allow integration of different devices in an open network. The protocol provides, for example, communication between devices configured for different networks, such as EtherNet/IP, DeviceNet, or ControlNet. The CEP protocol is also highly extensible allowing future devices or networks to be integrated as well. The structure of the protocol, however, makes it difficult to define rules by which a firewall may operate.

The CIP protocol, for example, includes many different types of messages. Two primary types of messages are explicit messages and implicit messages. Explicit messages follow a predefined format. Explicit messages may be used to establish a connection between a sender and a receiver and are configured in a request-reply format, meaning that a first device transmits a first message packet, such as a command or a request for data, to a second device and the second device transmits a second message packet, such as an acknowledgement of the command or the requested data, in reply to the first message packet. Implicit messages are configured based on an established connection between a sender and a receiver. Because the connection is established, the request-reply format need not be used. The implicit message may also transmit in a broadcast format, meaning a device transmits the message packet and does not expect and, therefore, does not wait for a reply. The implicit message may be initiated by an external trigger, a periodic interval, or some other predefined trigger mechanism. The explicit messages are typically utilized to transmit configuration data or other informational data that is not time-sensitive and/or that may be transmitted infrequently. Implicit messages are typically utilized to transmit data, such as Input/Output (I/O) data that must be updated at fixed intervals and/or requires frequent updating. The implicit messages include very little data regarding their configuration, structure, or other data about the message itself with the bulk of the message including data arranged according to a predefined format such that the transmitting device may generate the message efficiently and the receiving device may similarly process the message efficiently.

Further, a single device may be configured to transmit multiple types of messages or even a sequence of messages with another device. A motor drive, for example, may communicate with a processor module. The motor drive may receive configuration information from the processor module via explicit messages and may transmit data such as motor configuration or operation time to the processor module via explicit messages. The motor drive may also require a command message, such as a speed or torque command, be transmitted from the processor module using an implicit message repeated at a fixed interval and may similarly transmit operating data such as motor current or motor speed back to the processor module using implicit messages at a fixed interval.

Depending on the location of the processor module and the motor drive in the control system, the communications between the two devices may pass through a firewall. Traditional firewall rules utilize, for example, a source address and/or a destination address to determine whether a message is allowed to pass through the firewall. More complicated rules may further examine message packets to determine what operation (e.g., read/write) the message is intended to perform and may further allow message packets based on the operation the message is intended to perform.

For the above-described example of the motor drive communicating with the processor module, the explicit message and the implicit message take on different formats, contain different fields, or vary in other manners that prevent a single rule from allowing communication between the motor drive and the processor module. Further, the limited information contained in implicit messages about the message packet itself may make it difficult or impossible to configure a rule in a traditional firewall to allow the implicit messages to pass through. A system designer may need extensive knowledge of the CM protocol and each device for which it is desired to create a set of rules to permit all of the desired communications between the devices. Additionally, certain messages may be sent infrequently, such as a fault message, and have still another format. Thus, establishing an effective firewall to allow desired communications between the devices may require extensive setup and may be difficult to establish all of the necessary rules.

Thus, it would be desirable to provide an improved system for establishing rules in a firewall for an industrial network.

BRIEF DESCRIPTION OF THE INVENTION

The subject matter disclosed herein describes an improved system for establishing rules in a firewall for an industrial network. Rules are established at an application level, identifying, for example, actions to occur between two devices. The action may be, for example, read data table or update firmware, and each action may require multiple message packets to be transmitted between the two devices in order to complete. A network device executing the firewall is configured to receive message packets from a sending device and to inspect the message packets to determine which action the sending device is requesting to perform. If the action corresponds to a rule in the database, the network device allows the message packets to pass through the firewall and be communicated between the two devices until all message packets have been transmitted. Thus, a single action, or application, may be defined in the rules database to permit multiple data packets to be communicated between the devices.

According to one embodiment of the invention, a network device for providing secure communications between an internal device connected to an industrial network and at least one external device is disclosed. The network device includes a packet processing module configured to receive a first message packet from the external device and to extract multiple segments from the first message packet. An application classifier is configured to identify at least one application function based on the plurality of segments extracted from the first message packet, and each application function includes a first message packet and at least one additional message packet. A memory device stores a rules database which includes multiple rules defining whether an application function is allowed to be transmitted through the network device. A rules engine is configured to compare the application function identified by the application classifier to the rules database, and the network device establishes a connection between the external device and the internal device and transmits the first message packet to the internal device when the identified application function is allowed by one of the rules.

According to another embodiment of the invention, a method for providing secure communications between an internal device connected to an industrial network and at least one external device is disclosed. The method defines at least one firewall rule as a function of an application function on a network device connected to the industrial network between the internal device and the external device, and the application function includes a plurality of message packets. A first message packet is received from the external device at the network device, and multiple segments are extracted from the first message packet with a packet processing module executing on the network device. The method also identifies an application function to which the first message packet belongs based on the segments extracted from the first message using an application classifier executing on the network device. The identified application function is compared to the firewall rule using a rules engine to determine whether to transmit the received first message packet from the network device to the internal device.

According to still another embodiment of the invention, a network device for providing secure communications between an internal device connected to an industrial network and at least one external device is disclosed. The system includes a packet processing module configured to receive a first message packet from the external device and to extract multiple segments from the first message packet. An application classifier is configured to identify at least one application function based on the segments extracted from the first message packet, and each application function includes the first message packet and at least one additional message packet. A memory device stores an application database identifying multiple application functions executable by the network device. Each of the message packets are defined by a signature, and the application database stores at least one encrypted signature for each application function containing the signatures of the first message packet and each additional message packet.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which:

FIG. 8 is an exemplary data packet for a first request according to an industrial protocol for an industrial network incorporating one embodiment of the invention;

FIG. 9 is an exemplary data packet for a reply to the first request according to an industrial protocol for an industrial network incorporating one embodiment of the invention;

FIG. 11 is a tabular representation of message packets associated with one application for an industrial protocol for an industrial network incorporating one embodiment of the invention;

FIG. 12 is a block diagram representation of the network device of FIG. 1 managing multiple connections on the industrial network;

FIG. 14 is a tabular illustration of an exemplary application function with an unencrypted description of the signatures; and FIG. 15 is a tabular illustration of the exemplary application function of FIG. 14 with an encrypted description of the signatures.

Figure 1:
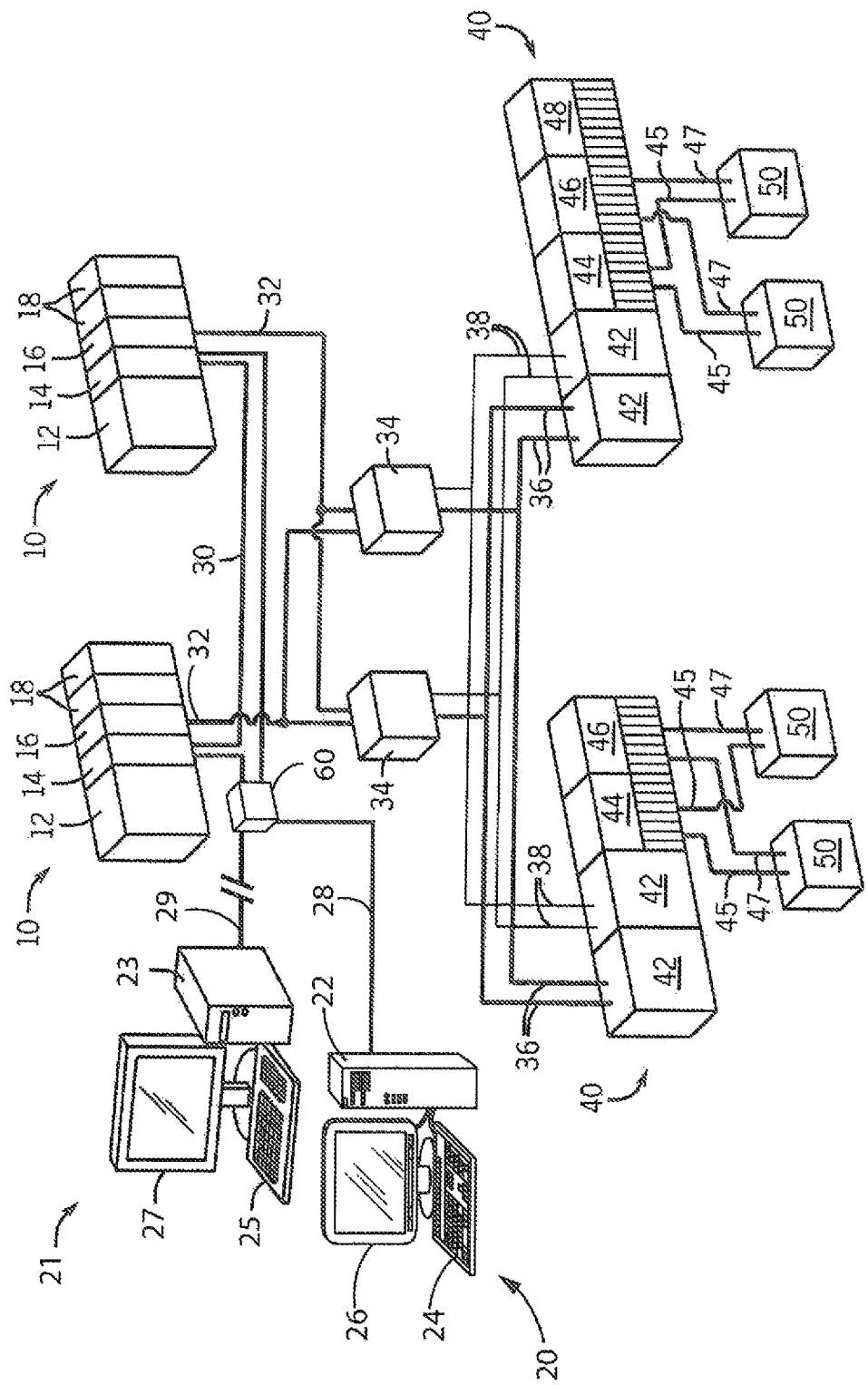
FIG. 1 is a schematic representation of an exemplary industrial control system incorporating one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

Turning initially to FIG. 1, an exemplary industrial control network includes a pair of industrial controllers 10. As illustrated, the industrial controller 10 is modular and may be made up of numerous different modules connected together in a rack or mounted to a rail. Additional modules may be added or existing modules removed and the industrial controller 10 reconfigured to accommodate the new configuration. Optionally, the industrial controller 10 may have a predetermined and fixed configuration. Each of the illustrated industrial controllers 10 includes a power supply module 12, processor module 14, and network module 16. Each industrial controller 10 is further shown with two additional modules 18 that may be selected according to the application requirements and may be for example, analog or digital input or output modules.

One or more operator interfaces 20 may be connected to the industrial control network. Each operator interface 20 may include a processing device 22, input device 24, including, but not limited to a keyboard, touchpad, mouse, trackball, or touch screen, and a display device 26. It is contemplated that each component of the operator interface may be incorporated into a single unit, such as an industrial computer, laptop, or tablet computer. It is further contemplated that multiple display devices 26 and/or multiple input devices 24 may be distributed about the controlled machine or process and connected to one or more processing devices 22. The operator interface 20 may be used to display operating parameters and/or conditions of the controlled machine or process, receive commands from the operator, or change and/or load a control program or configuration parameters. An interface cable 28 connects the operator interface 20 to one of the industrial controllers 10. The operator interface 20 may store one or more programs for communication with the industrial controllers 10.

One or more remote interfaces 21 may also be connected to the industrial control network. Each remote interface 21 may include a processing device 23, input device 25, including, but not limited to, a keyboard, touchpad, mouse, trackball, or touch screen, and a display device 27. It is contemplated that each component of the remote interface may be incorporated into a single unit, such as an industrial computer, laptop, or tablet computer. It is further contemplated that the remote interface 21 may be a desktop, laptop, or notebook computer which may further be connected to a server such that the remote interface 21 may include multiple display devices 27 and/or multiple input devices 25 connected to one or more processing devices 23. The remote interface 21 may be used to display operating parameters and/or conditions of the controlled machine or process or change and/or load a control program or configuration parameters. The remote interface 21 is connected to the industrial control network via a network connection 29 which may include a wired connection, wireless connection, or a combination thereof. The remote interface 21 may store one or more programs for communication with the industrial controllers 10.

A network device 60 may be inserted between the operator interface 20 and/or the remote interface 21 and the industrial control network. According to the illustrated embodiment, the operator interface 20 and the remote interface 21 are each connected to the network device 60. The network device 60 may be, for example, a switch or a router configured to receive message packets and distribute them to devices on the industrial network. Each of the industrial controllers 10 are similarly connected to the network device 60. Thus, both the operator interface 20 and the remote interface 21 may monitor operation, change configuration, and/or establish other bidirectional communication with each of the industrial controllers 10. The network device 60 may be configured to monitor message packets for intrusion detection and intrusion protection according to an embodiment of the invention and as discussed in more detail below. It is contemplated that the network device 60 may be configured to communicate via a proprietary interface or may be any standard industrial network, including, but not limited to, Ethernet/IP, DeviceNet, or ControlNet. Each network device 60 may also be configured to translate messages between two different network protocols. Although many examples discussed herein will be related to the CIP protocol, this is an exemplary embodiment and it is understood that the invention may be equally applicable to other industrial protocols.

The industrial controllers 10 are connected to other devices by one or more networks according to the application requirements. As illustrated, an interface cable 30 directly connects each of the processor modules 14. A redundant network topology is established by connecting the network interface module 16 of both industrial controllers 10 to each of a pair of switches 34 by a network cable 32. Each switch 34 is connected to one of a pair of remote racks 40 by a suitable network cable 36, 38. It is contemplated that the interface cable 30 or any of the network cables 32, 36, 38 may be a custom cable configured to communicate via a proprietary interface or may be any standard industrial network, including, but not limited to, Ethernet/IP, DeviceNet, or ControlNet. Each network module 16 and switch 34 is configured to communicate according to the protocol of the network to which it is connected and may be further configured to translate messages between two different network protocols.

Each remote rack 40 may be positioned at varying positions about the controlled machine or process. As illustrated, each remote rack 40 is modular and may be made up of numerous different modules connected together in a rack or mounted to a rail. Additional modules may be added or existing modules removed and the remote rack 40 reconfigured to accommodate the new configuration. Optionally, the remote rack 40 may have a predetermined and fixed configuration. As illustrated, each remote rack 40 includes a pair of network modules 42, each network module 42 connected to one of the redundant networks, an input module 44, and an output module 46. Each of the input modules 44 is configured to receive input signals 45 from controlled devices 50, and each of the output modules 46 is configured to provide output signals 47 to the controlled devices 50. Optionally, still other modules 48 may be included in the remote rack 40. It is understood that the industrial control network, industrial controller 10, and remote racks 40 may take numerous other forms and configurations without deviating from the scope of the invention.

Figure 2:
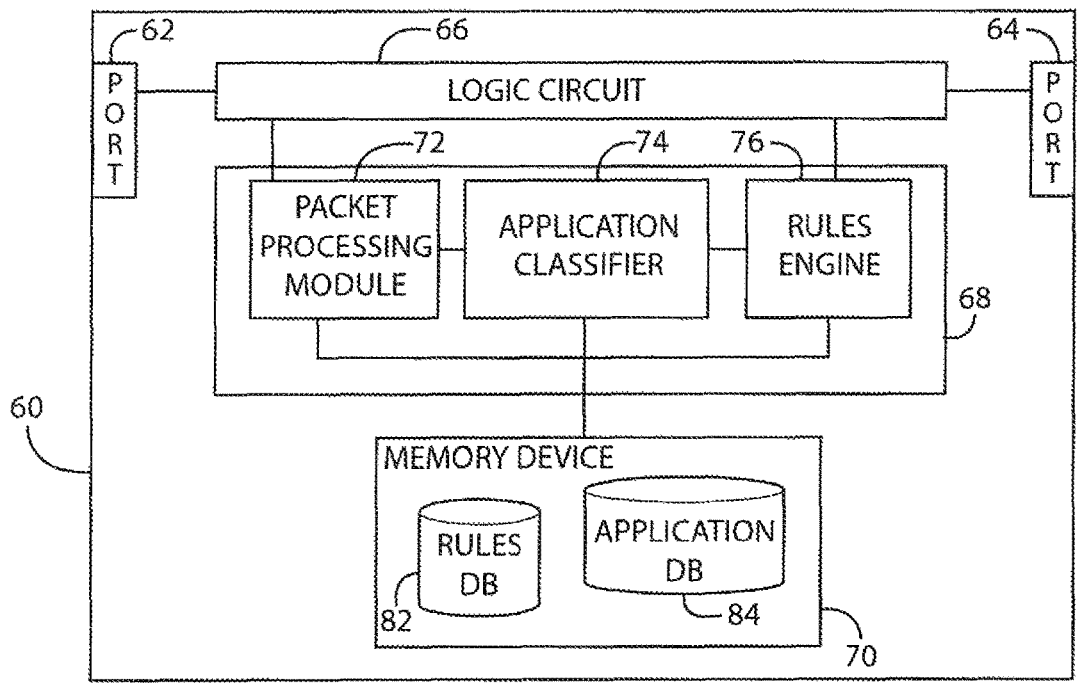
FIG. 2 is a block diagram representation of a network device of FIG. 1.

Turning next to FIG. 2, the illustrated network device 60 includes a first port 62 and a second port 64. Each of the ports 62, 64 includes a receive buffer and a transmit buffer to manage incoming and outgoing message packets, respectively. Although the illustrated network device 60 includes two ports 62, 64, it is contemplated that the network device 60 may include additional ports without deviating from the scope of the invention. A logic circuit 66 is in communication with each of the ports 62, 64. It is contemplated that the logic circuit 66 may include dedicated devices, such as analog and/or digital integrated circuit devices. It may further include additional devices to accelerate communications and/or execute dedicated processing tasks otherwise allocated to the processor 68. Optionally, the logic circuit 66 may be incorporated on a single electronic device, such as a field programmable gate array (FPGA) or application specific integrated circuit (ASIC). The network device 60 also includes a processor 68 and a memory device 70. The processor 68 may be any suitable processor according to the device requirements. It is contemplated that the processor 68 may include a single processing device or multiple processing devices executing in parallel and may be implemented in separate electronic devices or incorporated on a single electronic device, such as a FPGA or ASIC. Similarly, the memory device 70 may be a single device, multiple devices or may be incorporated in part or in whole within the FPGA or ASIC. The memory device 70 may include volatile memory, non-volatile memory, or a combination thereof. According to still another embodiment of the invention, the logic circuit 66, processor 68, and/or the memory device 70 may each be formed in part or in whole on the same device.

The processor 68 includes a packet processing module 72, an application classifier 74, and a rules engine 76. The packet processing module 72 performs initial processing of each message packet. The initial processing parses each packet into segments, or other components, for further processing. The application classifier 74 and the rules engine 76 are in communication with the packet processing module 72 and may each perform additional processing on the parsed data packets, as discussed in detail below. Optionally, one or more of the packet processing module 72, the application classifier 74, and the rules engine 76 may be executed on the logic circuit 66. According to one embodiment of the invention, the logic circuit 66 executes independently of the processor 68, improving the bandwidth of the network device 60. According to another embodiment of the invention, the logic circuit 66 works cooperatively with the processor 68. The processor 68 is configured to execute instructions stored in the memory device 70 and to access or store operating data and/or configuration parameters stored in the memory device 70. According to the illustrated embodiment, the network device 60 includes a rules database 82 and an application database 84 stored in the memory device 70.

Figure 3:
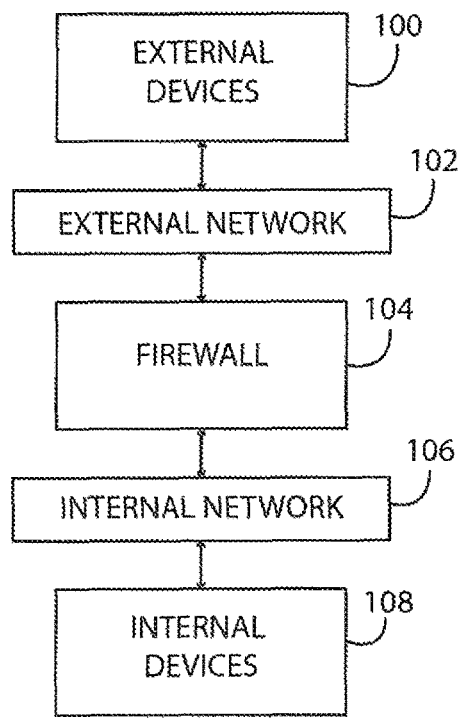
FIG. 3 is a block diagram representation of a firewall executing in one of the network devices.

Turning next to FIG. 3, a block diagram representation of devices communicating on the industrial control network is illustrated. A portion of the devices on the industrial control network are considered external devices 100 and a portion of the devices are considered internal devices 108. Although the devices will be referred to herein as external devices 100 or internal devices 108, the label is not intended to imply a specific or even a general location with respect to the controlled machine or process or with respect to each other, but rather to identify that the external devices 100 are located "outside" the firewall 104 and the internal devices 108 are located "inside" the firewall 104. An external network 102 is any network or combination of networks, either wired or wireless, by which the external devices 100 are connected to the firewall 104, and an internal network 106 is any network or combination of networks, either wired or wireless, by which the internal devices 108 are connected to the firewall 104. According to the exemplary network illustrated in FIG. 1, the network device 60 may be configured to execute the firewall 104. The operator interface 20 and/or the remote interface 21, for example, may each be an external device 100 and the industrial controllers 10, switches 34, and/or the remote racks 40 may be internal devices 108.

Figure 4:
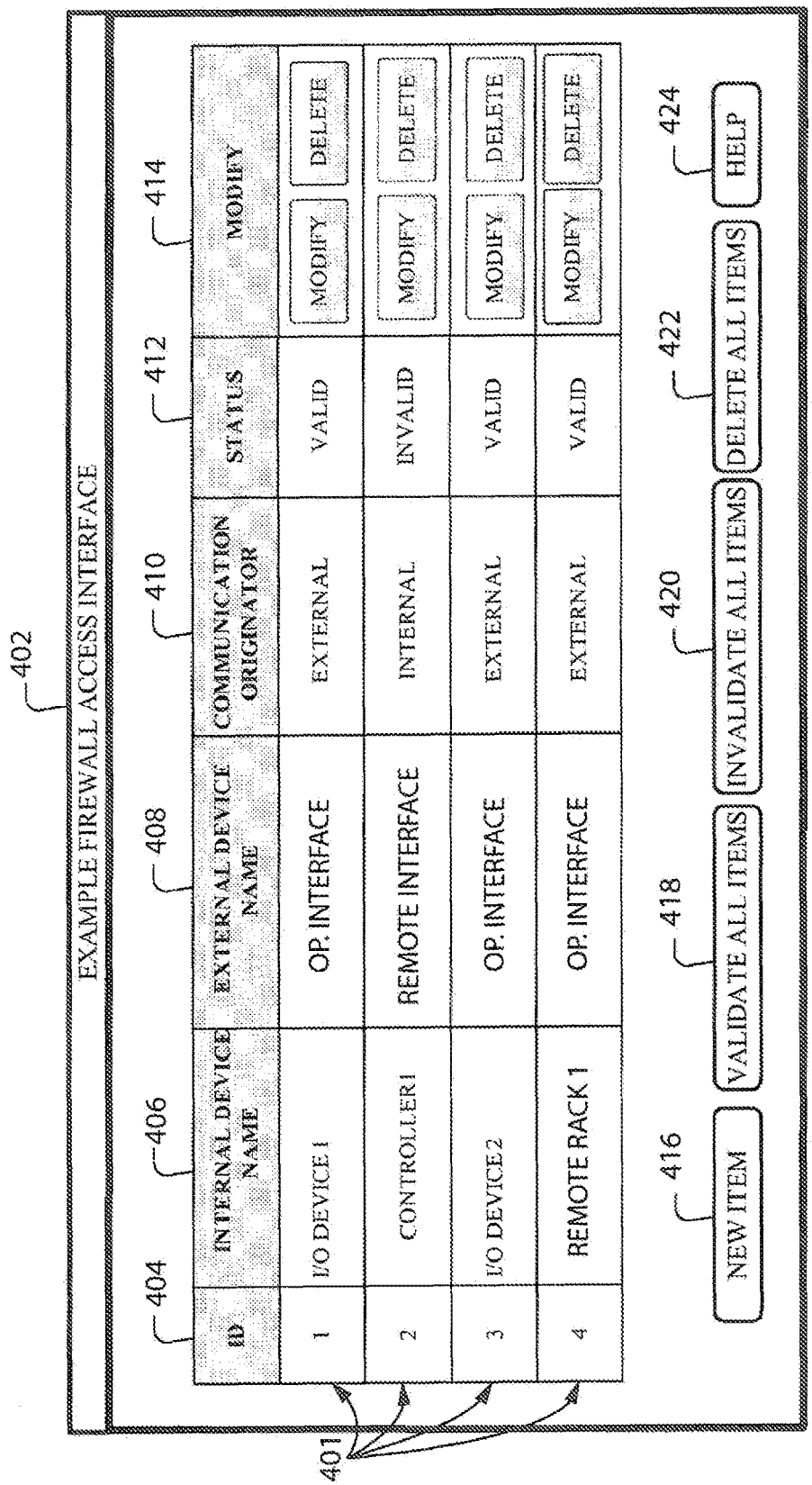
FIG. 4 is an exemplary display for a firewall rules access interface according to one embodiment of the invention.

Turning next to FIG. 4, an exemplary display for an interface 402 for establishing firewall rules for communication access between devices on the industrial network is illustrated. The interface 402 displays existing rules 401 defining relationships between devices. According to the illustrated embodiment, the rules 401 are assigned an identification number 404 and include an internal device name 406 and an external device name 408 which may be used by a programmer to identify devices in the control system. The communication originator 410 indicates whether communications are initiated by the internal device 108 or the external device 100 and the status 412 of the rule 401 indicates whether the rule is enabled or disabled. Icons, radio buttons, or any other suitable visual indicator provides an interface for a designer to edit the firewall rules. Modify buttons 414 are provided to either modify or delete existing rules and a new item button 416 is provided to permit the addition of new rules. Additional buttons permit, for example, validation 418, invalidation 420, or deletion 422 of all of the rules. A help button 424 provides access to a help screen or other tutorial file for the programmer.

Figure 5:
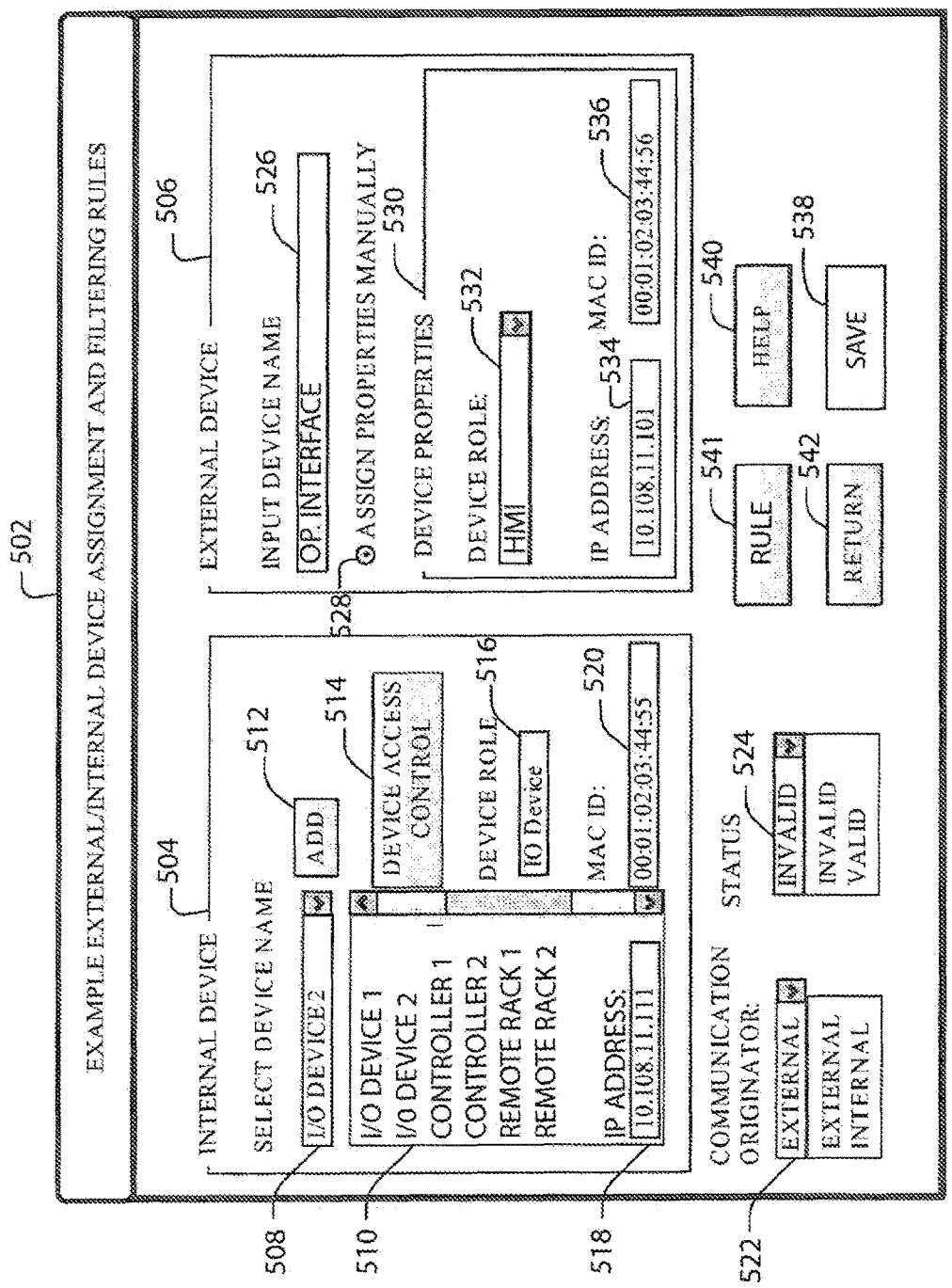
FIG. 5 is an exemplary display for a firewall rules device selection interface according to one embodiment of the invention.

FIG. 5 illustrates an exemplary interface for selecting devices between which a new firewall rule 401 will be defined. The device selection interface 502 provides an internal device field 504 and an external device field 506 by which an internal device 108 and an external device 100, respectively, may be selected for inclusion within the rule 401. An originator field 522 defines whether the internal device 108 or external device 100 originates communication and a status field 524 is used to enable and/or disable the rule. Icons are provided to save 538 the rule, define the rule 541, return 542 to the rules interface 402, or receive help 540 from a help screen or other tutorial file. The internal device field 504 identifies devices inside the firewall and connected to the internal network 106. A selected device field 508 corresponds to one of the internal devices 108 which may be selected from a drop down box 510 or added via an editor after selection of the add button 512. Additional fields within the internal device field 504 may be populated either manually or via automatic detection to define the selected device. The additional fields may include but are not limited to a device role field 516, an IP address 518, or a MAC ID 520. The external device field 506 identifies devices outside the firewall and connected to the external network 102. A device field 526 identifies one of the external devices 100 which may be selected from a drop down box, added via an editor, or automatically generated. Additional fields within the external device field 506 may be populated either manually or via automatic detection to define the selected device. The additional fields may include but are not limited to a device role field 532, an IP address 534, or a MAC ID 536.

Figure 6:
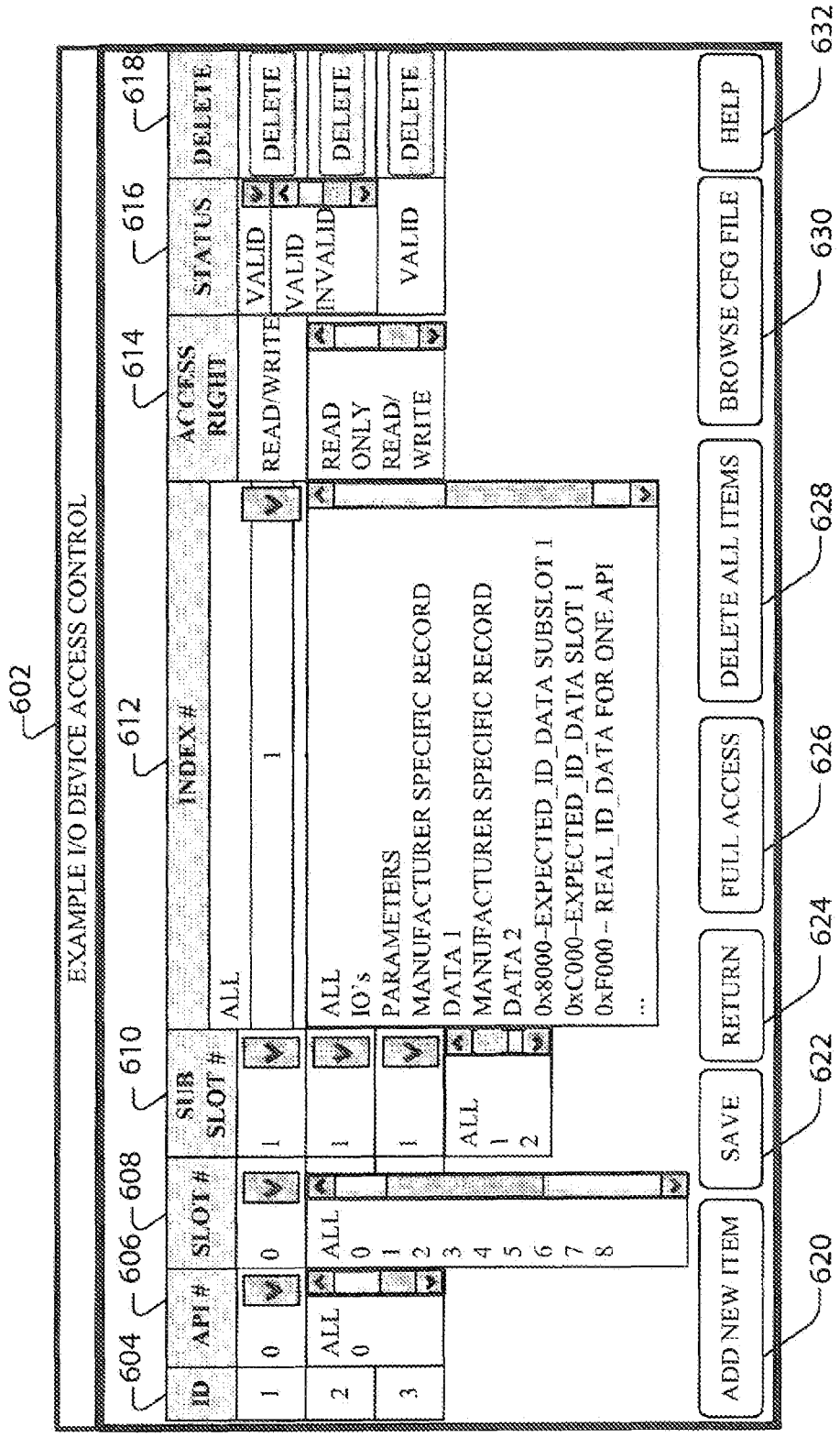
FIG. 6 is an exemplary display for a firewall rules device configuration interface according to one embodiment of the invention.

FIG. 6 illustrates an exemplary interface for editing an existing or adding a new device. The device configuration interface 602 may be launched from the rule interface 502. According to the illustrated embodiment, numerous fields for each device may be defined. The fields may include an ID number 604, identifying the device; an API number 606, identifying an application executing to interface to the device; or an index number 612, identifying a relationship within the control system. The fields may further include a physical location of the device in the control system such as a slot number 608 and a sub slot number 610 if required. An access right 614, identifying the type of access (e.g., read, write, or both) available to the device may be defined, and the availability of the device may be enabled/disabled with the status field 616. A delete button under the delete field 618 may be used to delete individual devices. Additional buttons may be defined to add a new device 620, save a device 622, return to a calling screen 624, providing full access to a device 626, deleting all items 628, or browse a configuration file 630 to obtain device information. A help button 632 provides access to a help screen or other tutorial file for the programmer.

Figure 7:
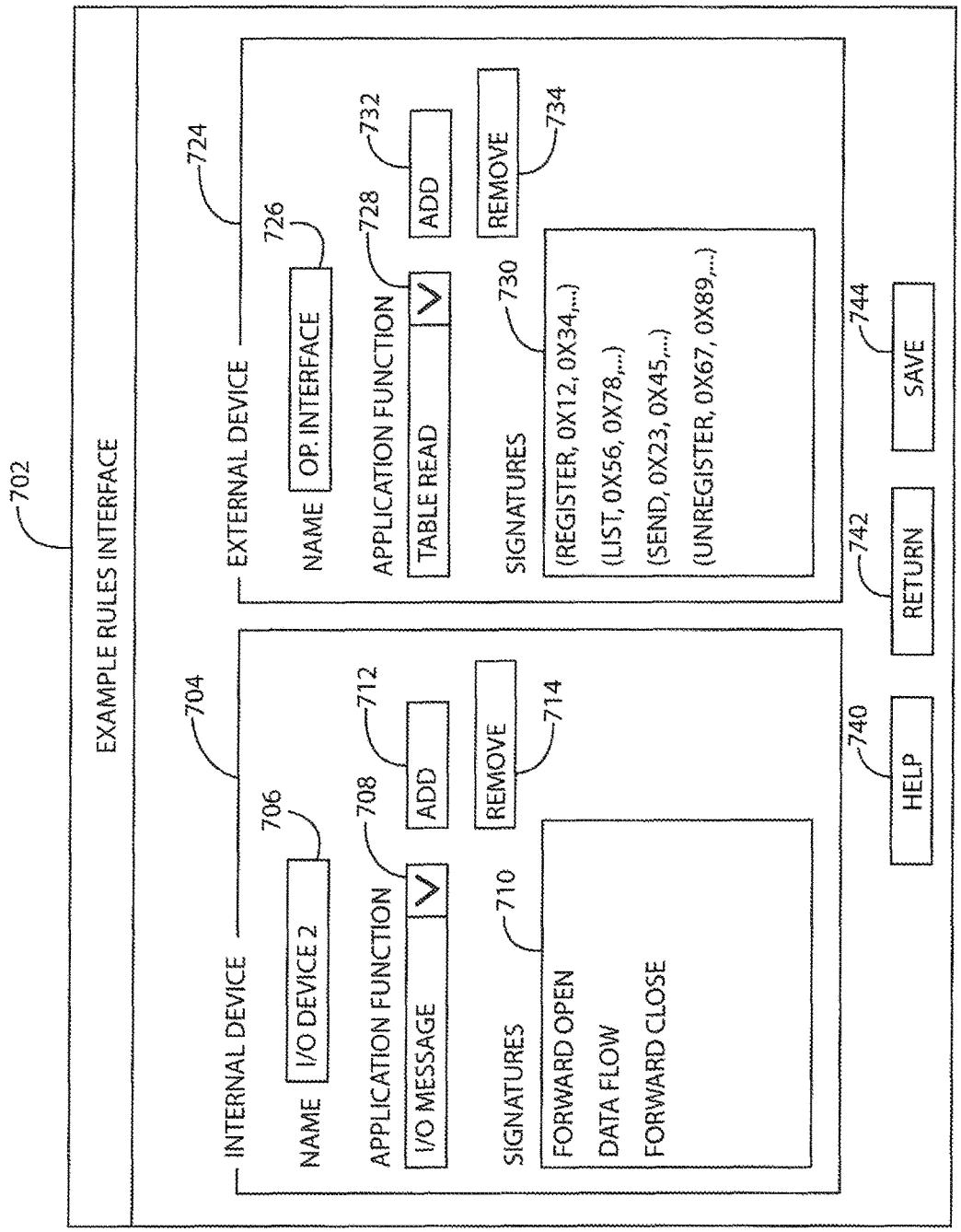
FIG. 7 is an exemplary display for a firewall rules editing interface according to one embodiment of the invention.

FIG. 7 illustrates an exemplary rule interface 702 for editing an existing or adding a new firewall rule 401. The rule interface 702 may be launched from the title button 541 on the device selection interface 502. The rule interface 702 includes an internal device interface 704 and an external device interface 724, which include a field identifying the names 706, 726 of the internal device 108 and the external device 100, respectively. Each device may be configured to perform one or more communication tasks with the other device. An internal application function field 708 allows one of the tasks for the internal device 108 to be selected, and an external application function field 728 allows one of the tasks for the external device 100 to be selected. Each device includes an add button 712, 732 and a remove button 714, 734 by which the selected application function may be added or removed from the rules database 82. The rule also defines whether each selected application function between devices is permitted or prevented. Thus, the rules may be defined based on the application function rather than on separate message packets.

As further illustrated, each application function may require multiple message packets to be transmitted between devices in order to perform the desired task. Each message packet associated with one of the application functions is listed in the signature field 710, 730 for the corresponding application. It is contemplated that the signatures shown in each signature field 710, 730 are populated based on the application function selected, as described above. Each signature is a description of one of the message packets to be transmitted for the corresponding application function and may take various forms. The signatures for the message packets in the internal device signature field 710 are described by a label corresponding to their function. The signatures for the message packets in the external device signature field 730 are described by exemplary fields of the message packet that may represent, for example, a name of the service performed by the message packet, one or more fields in the header 122 of the message packet 120 (as shown in FIG. 8), such as the command code 126, data length 128, or session handle 130, or a combination thereof. It is contemplated that still other signatures that describe the message packet may be utilized without deviating from the scope of the invention. In addition, FIGS. 4-7 present an exemplary embodiment of a user interface for configuring rules 401 for the firewall 104 executing on the network device 60 and are not intended to be limiting to the illustrated embodiment. It is understood that numerous other interfaces may be provided to define rules 401 in the firewall 104 without deviating from the scope of the invention.

In operation, the user interface permits definition of firewall rules at an application level rather than at a message packet level. Defining firewall rules based on functions each application performs provides a more intuitive interface for a system designer. For example, it may be desirable for one device to read a parameter of another device. With reference to FIG. 11, an exemplary application function 200 which is used for devices to read the parameter of another device is defined as "Get Attribute." The Get Attribute application includes a series of four message packets, each of which is an explicit message, meaning an originating device sends a request and the receiving device must send a response. For exemplary purposes, the originating device is an external device 100 and the receiving device is an internal device 108 and each message packet must pass through the firewall 104. The external device 100 generates a first message packet 202 of the application function 200. In the illustrated example, the first message packet 202 is a "Register Session" request. In combination with a successful response packet from the internal device 108, the Register Session request and response establish a session on the industrial network between the external device 100 and the internal device 108.

Referring also to FIGS. 8 and 9, exemplary message packets for a register session request 120 and register session response 140 are illustrated. The register session request 120 includes a command code 126 identifying the message packet as a register session request 120. The length of data field 128 indicates that the register session request 120 includes four bytes of data 124. Because this is the request to register a session on the network, the session handle 130 has not yet been established and the session handle 130 field is empty (or set to zero). According to the illustrated embodiment, the status field 132, sender context field 134, and options field 136 are also empty or set to zero. After the internal device 108 receives the register session request 120 from the external device 100, the internal device 108 generates the register session response 140. The structure of the response mirrors the structure of the request, including a command code 146, data length 148, session handle 150, status field 152, sender context field 154, options field 156, and data field 144. In the register session response 140, however, the session handle 150 is established by the internal device 108 and transmitted back to the external device 100.

Referring again to FIG. 11, once the session is established, a series of additional packets 204 are transmitted between the external device 100 and the internal device 108. The external device 100 sends a request packet that the internal device 108 "List Services" present on the internal device 108, and the internal device 108 transmits a responsive message packet listing services, which may be defined by a series of parameters present on the internal device 108. Having received the responsive message packet, the external device 100 sends a "Send Data" request packet to the internal device 108 identifying the desired parameter from which it wants to read, and the response packet from the internal device 108 includes the desired data. Having read from the desired parameter, the external device 100 transmits an "Unregister Session" packet to the internal device 108. A successful response packet from the internal device 108 to the external device 108 causes the session to be unregistered from the industrial network. As may be appreciated from the series of steps described above, absent an extensive understanding of the industrial protocol, a system designer is unlikely to be able to define a firewall rule for each of the message packets that are required to be transmitted between the internal device 108 and the external device 100. The messages may not require traditional fields such as a source and destination and the session handle is dynamically established, making it unsuitable for establishing a firewall rule. Further, even if the message is embedded within another message packet that includes such traditional fields, it may be desirable to allow only a portion of the message packets that one device is able to generate to transmit to another device while blocking another portion of the message packets. Even if details for each of the message packets generate by a device are provided, for example, in technical literature from a product vendor, defining firewall rules for each message packet is more time consuming than defining a single firewall rule for the application function 200.

Figure 10:
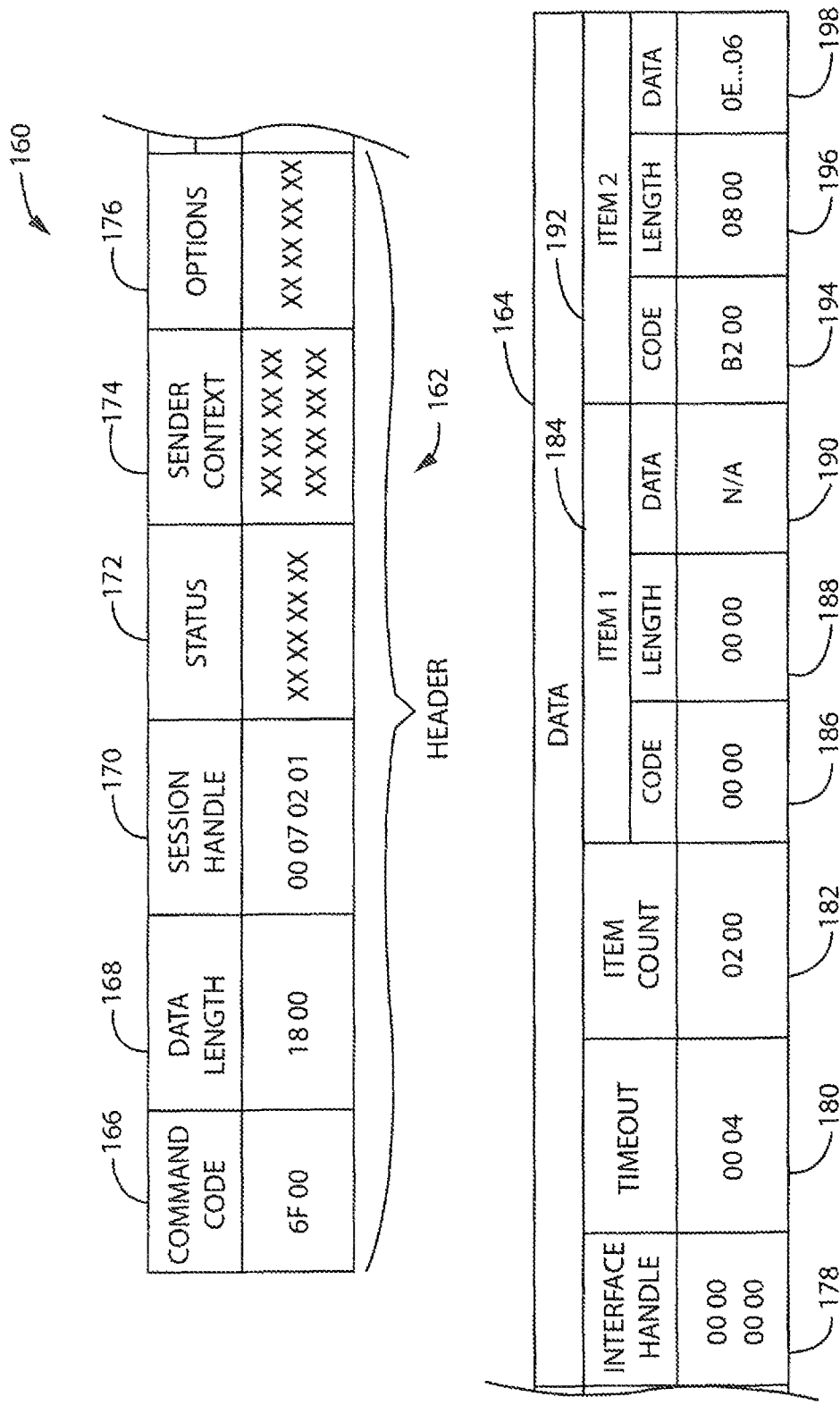
FIG. 10 is an exemplary data packet for a second request request according to an industrial protocol for an industrial network incorporating one embodiment of the invention.

As discussed above with respect to FIGS. 8 and 9, a portion of the message packets are configured in a request-reply format. A portion of the message packets may also be formatted for broadcast-type messages. The broadcast messages may be read by multiple devices and do not expect a reply from another device. Referring next to FIG. 10, an exemplary broadcast message 160 is illustrated. As illustrated, the broadcast message 160 includes a header 162 similar in nature to the response-request messages of FIGS. 8 and 9. The header 162 includes a command code 166, length of data field 168, session handle 170, status field 172, sender context field 174, and options field 176. Optionally, it is contemplated that the header 162 may include fewer data fields and may include, for example, only a session handle 170. The data field 164 includes an interface handle 178 and timeout 180 for interface to non-CIP protocols. The data field 164 further includes an item count field 182 identifying the number of data items to follow. According to the illustrated embodiment, a first data item 184 and a second data item 192 exist in the message packet. Each data item 184, 192 includes a code 186, 194 identifying the type of data contained within the data item 184, 192, a length 188, 196 identifying the number of bytes of data contained within the data item 184, 192, and the data 190, 198 corresponding to the type of data and length of data as previously defined for each data item 184, 192.

As discussed above, the firewall rules are managed at an application level. It is contemplated that the application may be an application layer protocol corresponding to the Application Layer in the standard OSI model executing on a supervisory controller, human machine interface (HMI), or other device. It is further contemplated that the application may be a user-defined application executing on, for example, the industrial controller 10. The user may, for example, generate an Add-On-Instruction (AOI) or other user-generated function in which a series of message packets are transferred on the industrial network. In either example, a firewall rule may be defined to identify a function performed by the application in order to permit each of the message packets to pass through the firewall without defining a rule for each message packet.

In addition to managing firewall rules at an application level, the network device 60 is configured to manage multiple connections between different devices on the industrial network. The network device 60 is configured to execute the firewall 104 via a combination of the logic circuit 66 and the processor 68. With reference to FIGS. 3 and 12, the external network 102 may include network connections 28, 29 and the internal network 106 may include network connections 30, 32. Multiple connections 210 are illustrated as being established through the firewall to transmit data packets 202, 204 between external devices 100 and internal devices 108.

Figure 13:
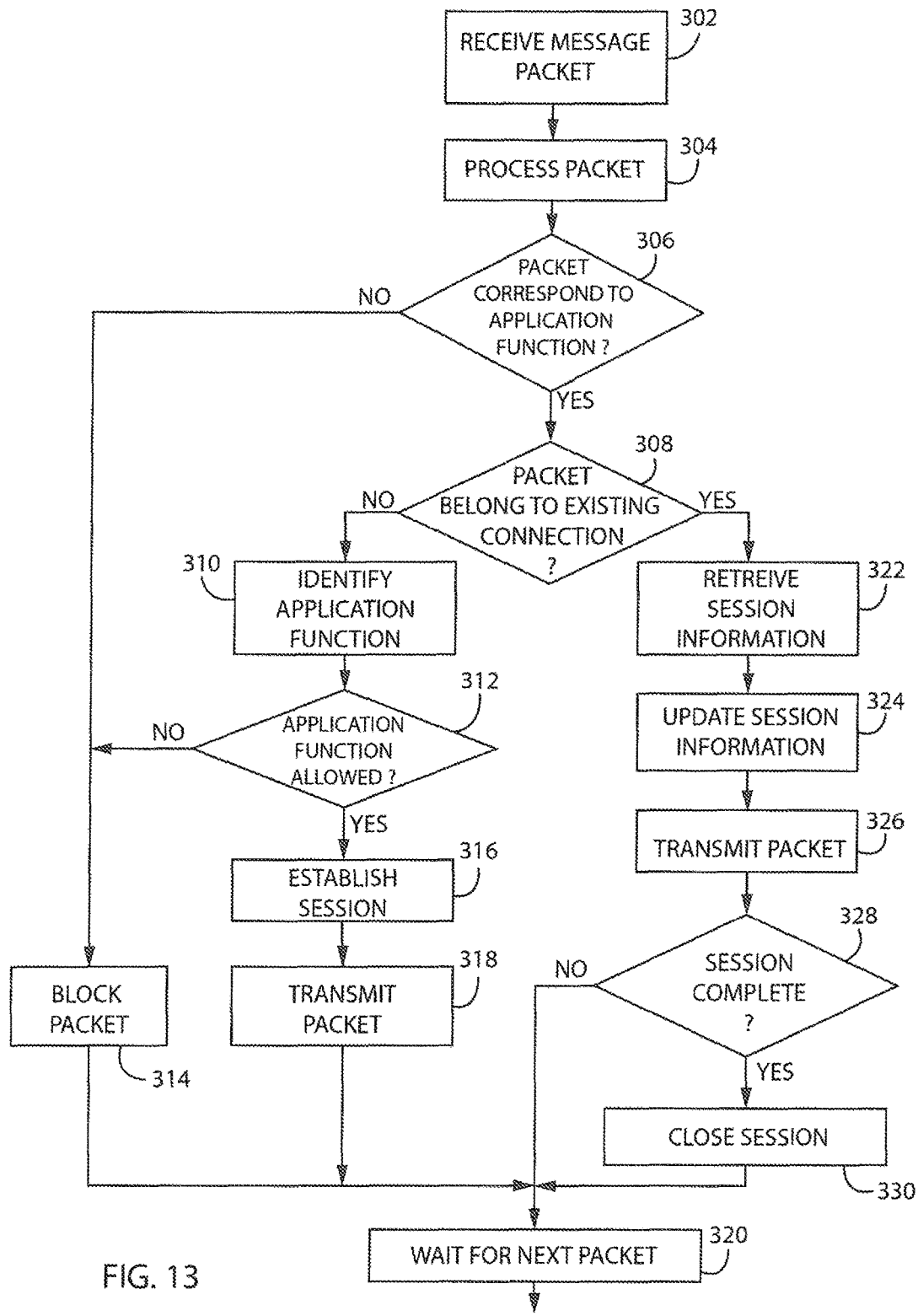
FIG. 13 is a flowchart illustrating the execution of a connection manager implementing the firewall rules according to one embodiment of the invention.

Referring also to FIGS. 12 and 13, a connection manager 300 is configured to execute on the network device 60 and may execute in the logic circuit 66, processor 68, or a combination thereof. The connection manager 300 receives message packets 202, 204 transmitted on the industrial network and can establish new sessions between devices, manages existing sessions, and closes sessions when communications between devices are complete. At step 302, the connection manager 300 receives a message packet 202, 204. The packet processing module 72 parses each message packet 202, 204 to extract at least a portion of the fields from the header 122, 142, 162 and/or data segment 124, 144, 164 of the message packet 202, 204 as shown in step 304. The fields obtained from each message packet 202, 204 are examined by the application classifier 74 to determine whether the message packet 202, 204 is a first message packet 202 or an additional message packet 204 for an application function 200, as shown in step 306. The application classifier 74 may, for example, access an application database 84 stored in the memory device 70 and compare the received message packet to a list of stored application functions 200 and the corresponding message packets 202, 204 belonging to each application function 200 to determine whether each received packet corresponds to one of the stored application functions 200. To speed processing, it is contemplated that one or more fields, for example, a command code 126 or a combination of a command code 126 and another field, such as data length 128, may be compared to the list of message packets 202, 204 stored in the application database 84. If the received packet does not correspond to a stored application function 200, at step 314, the firewall 104 blocks transmission of the received packet through the network device 60. If the received packet does correspond to a stored application function 200, the connection manager 300 proceeds to step 308 to determine whether the received packet is part of an existing connection 210.

If the received packet is not part of an existing connection 210, the connection manager 300 determines whether to establish a new connection 210 or to block the received packet. At step 310, the connection manager 300 identifies to which application function 200 the received packet belongs. Optionally, this step may be performed in tandem with step 306, during which the application classifier 74 determines whether each received packet belongs to one of the application functions 200. When making the determination, for example, the application classifier 74 may store the application function 200 to which the received packet belongs. The connection manager 300 next determines whether the application function 200 is allowed, as shown in step 312. The rules engine 76 is executed to compare the identified application function 200 to firewall rules 401 stored in the rules database 82 on the memory device 70. If necessary, additional fields extracted from the received packet may be evaluated to determine whether a specific instance of an application function 200 may be executed. If the rules database 82 indicates that the message packets 202, 204 associated with the application function 200 are permitted to be transmitted through the firewall 104, a new session on the industrial network is established, as shown in step 316, where the session defines a connection 210 between an external device 100 and an internal device 108 and defines an initial state for the connection 210. At step 318, the received packet is transmitted through the firewall 104. If, however, the rules database 82 indicates that the specific instance of the application function 200 is not allowed through the firewall 104, the received packet is blocked, as shown in step 314. After either transmitting or blocking the received packet, the connection manager 300 proceeds to step 320 to wait for the next message packet.

If the received packet is part of an existing connection 210, the connection manager 300 retrieves the session information, as shown in step 322. The session information may include, for example, a session handle 130, state information for the session, the application function 200 executing within the session, and the like. The state information may identify which of the message packets 202, 204 were most recently sent or is the next packet to be sent. The session manager 300 may then verify that the received packet is, in fact, the next packet to be sent for the application function 200 executing in the session. If the received packet is the next packet to be transmitted for the application function 200, the session manager 300 updates the state information and stores the updated session information 324 in the memory device 70, as illustrated in step 324. At step 326, the session manager 300 transmits the packet through the firewall. At step 328, the session manager 300 may also check if the session is complete. If the session is complete, the session manager closes the session, as shown in step 330. After closing the session or if the session is not complete, the session manager 300 then waits for the next message packet, as shown in step 320. Although execution of the session manager 300 was discussed above with respect to a particular sequence of steps as illustrated in the flowchart in FIG. 13, it is understood that the steps may be performed in various combinations and/or sequences to manage execution of the application level firewall rules without deviating from the scope of the invention. It is further contemplated that multiple connections 210 between devices may exist and packets belonging to any one of the connections 210 may be received by the network device 60 in any order. The connection manager 300 maintains session information for each of the connections 210 to ensure that each of the message packets belonging to an application function 200 are either allowed to pass or are denied transmission through the firewall 104 according to the firewall rules 401 stored in the rules database 82.

It is further contemplated that the processor 68 in the network device 60 may be configured to execute a training routine, by which it automatically populates the rules database 82. During the training routine, the firewall 104 monitors message packets 202, 204 transmitted on the industrial network but is configured to temporarily permit all message packets 202, 204 to pass through the firewall 104. The controlled machine or process is configured to operate under normal operating conditions and the network device 60 observes connections 210 established and message packets transmitted between devices. Similar to the processing performed to determine whether to permit a message to pass when the firewall is operating normally, the network device 60 passes message packets to the packet processing module 72 to extract at least a portion of the fields from the header 122, 142, 162 and/or data segment 124, 144, 164 of the message packet 202, 204. The fields obtained from each message packet 202, 204 are examined by the application classifier 74 to determine whether the message packet 202, 204 is a first message packet 202 or an additional message packet 204 for an application function 200, as shown in step 306. The application classifier 74 may, for example, access an application database 84 stored in the memory device 70 and compare the received message packet to a list of stored application functions 200 and the corresponding message packets 202, 204 belonging to each application function 200 to determine whether each received packet corresponds to one of the application functions 200. In this manner, the network device learns which application functions 200 need to be executed by each device and with which other devices each device needs to communicate. The processor 68 in the network device 60 is further configured to generate firewall rules 401 corresponding to the observed application functions 200 and store the firewall rules 401 in the rules database 82 for use during normal operation.

Generating firewall rules 401 based on the observed application functions 200 during the training routine results in a more complete set of firewall rules 401 for the industrial network than generating rules 401 based on individual message packets 202, 204. An application function 200 may contain a number of message packets that may be transmitted as part of an application function 200. For certain application functions 200, however, not all message packets may be transmitted each time an application function 200 is executed. The application function 200 may, for example, transmit a first set of message packets 202, 204 under a first set of operating conditions, a second set of message packets 202, 204 under a second set of operating conditions, and still other message packets 202, 204 for configuration of and/or handling fault conditions on a device. Although the training period may be set for an extended period of time, such as hours, days, or weeks, it is possible and perhaps likely that not every potential message packet that needs to be transmitted on the industrial network is transmitted during the training period. If firewall rules 401 are generated based solely on observed message packets, a subset of all message packets 202, 204 is observed and, therefore, firewall rules 401 are only generated to permit the subset of message packets 202, 204 to be transmitted through the firewall 104.

When the less regular message packet 202, 204 is subsequently transmitted, outside of the training routine, the firewall 104 would initially block the message packet 202, 204. The blocked message packet 202, 204 could result in undesirable stoppage of the controlled machine or process and could further require manual intervention to identify the blocked message packet 202, 204; determine whether it should be permitted through the firewall 104; and to generate a new firewall rule 401 accordingly. In contrast, by identifying an application function 200 associated with certain message packets 202, 204 and generating firewall rules 401 at the application level, all message packets 202, 204 associated with the application function 200 will be permitted through the firewall 104. Thus, the training routine generates a more complete set of firewall rules 401, resulting in less subsequent down time and manual intervention in the controlled machine or process to supplement the firewall rules 401.

According to another aspect of the invention, the data signatures for each application function 200 may be encrypted prior to distribution in either a device or software configured to interface with the device. Referring next to FIGS. 14 and 15, an application function 800 includes multiple message packets each defined by a signature 802. The application function 800 is further identified by a version 804 and a revision 806. The version 804 may identify major changes in the application function 800 while the revision 806 may identify minor changes and/or updates to the application function 800. Optionally, the application function 800 may be identified by any other means, such as a single field identifying different versions of the application function 800 or solely by the signatures 802 corresponding to the application function 800. As illustrated in FIG. 14, each signature 802 is provided in a list, which may be stored via any conventional method such as a database, data structure, or the like. As illustrated in FIG. 15, the individual signatures 802 have been encrypted and combined into one encrypted signature 810.

The application function 800 and the list of signatures 802 may be stored in the device initiating communication as a template for generating message packets. The list of signatures 802 may similarly be stored in the application database 84 on the network device 60 for implementing firewall rules 401. Further, receiving devices may include a list of signatures 802 to verify message packets are received correctly. If a device is upgraded or a new device added, a new set of signatures 802 may need to be loaded into the device or into the database. Typically, the signatures 802 would be provided on a removable medium or transmitted electronically in a file. A computer executing the appropriate software and configured to upload the new signatures 802 to a device may include a monitor or on which the list of signatures 802 is displayable or readable in a manner as shown in FIG. 14. Further, during operation of the controlled machine or process, a network monitoring device may be connected to the industrial network to observe message packets being transmitted on the industrial network and obtain a packet signature 802. It may be possible for a technician to compare the packet signatures 602 observed being transmitted on the industrial network to the list of signatures 802 in an application function 800 in order to identify specific application functions 800 that need to be allowed to transmit messages through the firewall 104. As a result, observing a few transmitted message packets or inspecting stored data in a device or in the firewall databases may provide identification of application functions 800 that correspond to the observed message packets.

In order to improve the security of the firewall 104, it may be desirable to encrypt the individual signatures 802 of message packets belonging to an application function 800, resulting in an encrypted signature 810 for the application function 800. According to the illustrated embodiment, each signature 802 is passed through an encryption routine to convert the human readable data into encoded data. Each of the encoded signatures are combined into a single encrypted signature 810 and stored with the application function 800. It is contemplated that various encryption routines may be utilized and the encoded signatures may be stored in any order or in an interleaved manner within the encrypted signature 810. It is further contemplated that the encrypted signature 810 may be divided into multiple encrypted signatures 810 if desired.

The encrypted signature 810 is utilized to provide a secure method of updating signatures 802 on devices and/or configuring firewall rules 401. When an existing signature is updated or a new signature is added to a device, each of the signatures 802 are encrypted to generate the encrypted signature 810. The encrypted signature 810 is stored in an electronic file and transmitted via the removable medium, a network connection, or any other suitable method. The encrypted signature 810 may then be loaded to the device or added to the application database 84. The device to which the encrypted signature 810 is provided and the application database 84 are configured to extract signatures 802 from the encrypted signatures 810. Thus, the updated or new signatures 802 may be distributed without exposing the signature in a human readable form.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A network device for providing secure communications between an internal device connected to an industrial network and at least one external device, wherein a plurality of application functions execute on the at least one external device, the network device comprising:

a memory device operative to store a rules database and an application database, the application database including a plurality of application functions, wherein each application function is defined by a plurality of message packets formatted according to an industrial network protocol and wherein the application database includes the signature of each of the plurality of message packets defining each application;

a packet processing module configured to receive each of the plurality of message packets from the at least one external device and to extract a signature from each received message packet;

an application classifier configured to identify one of the plurality of application functions stored in the application database based on the signature extracted from each message packet, a rules engine operable to compare the application function identified by the application classifier to each rule in the rules database responsive to receiving a first message packet, wherein each rule identifies one of the plurality of application functions and defines whether the plurality of message packets for the corresponding application function is allowed to pass through the network device and wherein the network device establishes a connection between the external device and the internal device when the identified application function is allowed by one of the rules, and a connection manager operative to:
- transmit the first message packet to the internal device after the connection is established,
- identify each additional message packet belonging to the application function on the established connection, and
- transmit the additional message packets belonging to the application function to the internal device via the established connection without comparing each additional message packet to the rules database.

2. The network device of claim 1, wherein:
the rules engine includes a first state in which each of the first message packets is compared to the plurality of rules in the database to determine whether the corresponding application function is allowed or denied and whether to transmit the first message packet, and
the rules engine includes a second state in which the additional message packets corresponding to each allowed application function are transmitted.

3. The network device of claim 2 wherein the application database defines a plurality of states for each application function.

4. The network device of claim 2 wherein:
a plurality of external devices are connected to a plurality of internal devices,
the network device establishes a plurality of connections between the external devices and the internal devices, and
the connection manager is configured to maintain a record of each connection and a current state of each connection.

5. The network device of claim 1 wherein:
the plurality of rules are configurable from a user interface, and
each of the plurality of packet signatures is encrypted prior to display on the user interface.

6. The network device of claim 1 further comprising a processor operable in a learning mode to:
- disable at least a portion of the rules in the rules database, allowing message packets to be transmitted between each external device and the internal device,
- store in the memory device a record of the application function identified when the rules are disabled, and
- generate at least one new rule to define whether an application function is allowed or denied based on the record stored in the memory device.

7. The network device of claim 1 wherein the first packet is a first protocol and the at least one additional message packet is a second protocol, the second protocol being different than the first protocol.

8. A method for providing secure communications between an internal device connected to an industrial network and at least one external device, the method comprising the steps of:
defining at least one firewall rule on a network device connected to the industrial network between the internal device and the at least one external device, wherein each firewall rule is a function of one of a plurality of application functions executing on the at least one external device;
receiving a plurality of message packets for the application function from the external device at the network device;
extracting a signature from each received message packet with a packet processing module executing on the network device;
identifying one of the plurality of application functions from an application database stored on the network device based on the signatures extracted from each message packet using an application classifier executing on the network device, wherein:
the application database includes a plurality of application functions,
each application function is defined by a plurality of message packets formatted according to an industrial network protocol, and
the application database includes the signature of each of the plurality of message packets defining each application;
comparing the identified application function to each of the firewall rules using a rules engine when the received message packet is a first message packet of the identified application, wherein each rule identifies one of the plurality of application functions and defines whether the plurality of message packets for the corresponding application function is allowed to pass through the network device;
establishing a connection on the industrial network between the internal device and the external device with a connection manager when the rules engine determines the identified application is allowed by one of the firewall rules; and
transmitting each of the plurality of message packets to the internal device via the established connection when the message packet belongs to the application function on the established connection.

9. The method of claim 8 wherein a plurality of external devices are connected to a plurality of internal devices and wherein a plurality of connections between the external devices and the internal devices are established, the method further comprising the step of maintaining a record of each connection and a current state of each connection with the connection manager executing on the network device.

10. The method of claim 8 further comprising an initial step of disabling the firewall rules such that each of the received message packets are transmitted from the network device to the internal device.

11. The method of claim 10 further comprising the steps of:
storing in a memory device of the network device a record of the application function identified when the rules are disabled, and
generating at least one firewall rule to define whether the application function is allowed or denied based on the record stored in the memory device.

12. The method of claim 8 wherein the first message packet is a first protocol and at least one of the additional message packets is a second protocol, the second protocol being different than the first protocol.

13. A network device for providing secure communications between an internal device connected to an industrial network and at least one external device, wherein a plurality of application functions execute on the at least one external device, the network device comprising:
- a memory device operative to store a rules database and an application database, the application database including a plurality of application functions, wherein each application function is defined by a plurality of message packets formatted according to an industrial network protocol and wherein the application database includes the signature of each of the plurality of message packets defining each application;
- a packet processing module configured to receive a message packet from the at least one external device and to extract a signature from the message packet;
- an application classifier configured to identify one of the plurality of application functions stored in the application database based on the signature extracted from the message packet; and
- a connection manager operative to establish a connection between the external device and the internal device when the identified application function is allowed by a rule in the rules database and to transmit each message packet belonging to the application function to the internal device via the connection, wherein:
- each rule identifies one of the plurality of application functions and defines whether the plurality of message packets for the corresponding application function is allowed to pass through, the network device,
- the application database stores at least one encrypted signature for each application function,
- a rules engine compares the extracted signature to the at least one encrypted signature to verify that the extracted signature belongs to the application function.

14. The network device of claim 13 wherein:
the application database defines a plurality of packet signatures for each application function, each packet signature corresponding to one of the message packets for the application function;
the plurality of rules are configurable from a user interface, and
each of the plurality of packet signatures for the application function is encrypted prior to display on the user interface.

15. The network device of claim 13 wherein:
a plurality of external devices are connected to a plurality of internal devices,
the network device establishes a plurality of connections between the external devices and the internal devices, and
the connection manager is configured to maintain a record of each connection and a current state of each connection.

16. The network device of claim 13 further comprising a processor operable in a learning mode to:
disable at least a portion of the rules in the rules database, allowing message packets to be transmitted between each external device and the internal device,
store in the memory device a record of at least one of the message packets and the application function identified when the rules are disabled, and
generate at least one new rule to define whether an application function is allowed or denied based on the record stored in the memory device.

* * * * *